United States Patent
Wang et al.

(10) Patent No.: US 11,328,181 B2
(45) Date of Patent: May 10, 2022

(54) KNOWLEDGE GRAPH-BASED QUERY IN ARTIFICIAL INTELLIGENCE CHATBOT WITH BASE QUERY ELEMENT DETECTION AND GRAPH PATH GENERATION

(71) Applicant: International Business Machines Corporation, Armonk, NY (US)

(72) Inventors: Wen Wang, Beijing (CN); Jian Dong Yin, Beijing (CN); Zhuo Cai, Beijing (CN); Rong Fu, Ningbo (CN); Hao Sheng, Ningbo (CN); Kang Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 16/550,786

(22) Filed: Aug. 26, 2019

(65) Prior Publication Data
US 2021/0064932 A1    Mar. 4, 2021

(51) Int. Cl.
*G06F 16/332*    (2019.01)
*G06K 9/62*    (2022.01)
(Continued)

(52) U.S. Cl.
CPC ......... *G06K 9/6262* (2013.01); *G06F 16/338* (2019.01); *G06F 16/3322* (2019.01);
(Continued)

(58) Field of Classification Search
CPC . G06K 9/6262; G06F 16/3322; G06F 16/338; G06F 16/9024; G06F 16/3329; G06N 5/02; H04L 51/02
See application file for complete search history.

(56) References Cited

U.S. PATENT DOCUMENTS 10,366,168 B2    7/2019 Wu
10,810,193 B1 *  10/2020 Subramanya ....... G06F 16/9024
(Continued)

FOREIGN PATENT DOCUMENTS

CN    109271506 A    1/2019
WO    WO2018214164 A1    11/2018

OTHER PUBLICATIONS

Wei et al., "How to Build a Chatbot: A Chatbot Framework and its Capablities," ICMLC 2018 Proceedings of the 2018 10th International Conference on Machine Learning and Computing, Macau, China, Feb. 26-28, 2018 pp. 369-373. https://dl.acm.org/citation.cfm?id=3195169.

(Continued)

*Primary Examiner* — Beau D Spratt
(74) *Attorney, Agent, or Firm* — Yee & Associates, P.C.

(57) ABSTRACT

Generating a query result utilizing a knowledge graph in an artificial intelligence chatbot is provided. Characteristics of a query are identified. The characteristics of the query are mapped to base elements of the knowledge graph in the artificial intelligence chatbot. A set of query paths are generated in the knowledge graph based on the mapping of the characteristics of the query to the base elements of the knowledge graph. One or more query paths in the set of query paths in the knowledge graph are validated based on a respective score of each query path. A query result corresponding to the query is generated based on the validated one or more query paths in the knowledge graph.

21 Claims, 5 Drawing Sheets

(51) Int. Cl.
*G06N 5/02* (2006.01)
*H04L 51/02* (2022.01)
*G06F 16/338* (2019.01)
*G06F 16/901* (2019.01)

(52) U.S. Cl.
CPC ...... *G06F 16/3329* (2019.01); *G06F 16/9024* (2019.01); *G06N 5/02* (2013.01); *H04L 51/02* (2013.01)

(56) References Cited

U.S. PATENT DOCUMENTS

| | | |
|---|---|---|
| 11,043,214 B1* | 6/2021 | Hedayatnia ............. G10L 15/19 |
| 2013/0262361 A1* | 10/2013 | Arroyo ............... G06F 16/3344 706/46 |
| 2017/0154108 A1* | 6/2017 | Kraus ................. G06F 16/3346 |
| 2018/0144257 A1 | 5/2018 | Ankisettipalli et al. |
| 2018/0196796 A1 | 7/2018 | Wu |
| 2019/0042988 A1 | 2/2019 | Brown et al. |
| 2019/0188218 A1* | 6/2019 | Harris ....................... G06N 3/08 |
| 2019/0228107 A1* | 7/2019 | Trim ....................... H04L 51/02 |
| 2019/0311375 A1* | 10/2019 | Sapoznik ............. G06F 16/245 |
| 2019/0354544 A1* | 11/2019 | Hertz ..................... G06N 20/10 |
| 2020/0074999 A1* | 3/2020 | Elliott ................ G06F 16/9024 |

OTHER PUBLICATIONS

PCT International Search Report and Written Opinion, dated Nov. 26, 2020, regarding Application No. PCT/IB2020/057761, 9 pages.

* cited by examiner

KNOWLEDGE GRAPH-BASED QUERY IN ARTIFICIAL INTELLIGENCE CHATBOT WITH BASE QUERY ELEMENT DETECTION AND GRAPH PATH GENERATION

BACKGROUND

1. Field

The disclosure relates generally to knowledge graphs and more specifically to utilizing a knowledge graph in an artificial intelligence chatbot with base query element detection and graph path generation.

2. Description of the Related Art

In computing, a graph database is a database that utilizes a graph structure for semantic queries with nodes, edges, and properties to represent stored data. The graph structure relates data items to a collection of nodes and edges, the edges representing relationships between the nodes. The relationships allow data to be linked together directly and, in many cases, retrieved with one operation. Querying relationships within a graph database is fast because the relationships are stored within the database itself. Relationships can be intuitively visualized using the graph database, making the relationships useful for heavily inter-connected data. Retrieving data from a graph database requires a query language. In addition to having query language interfaces, some graph databases are accessed via application programming interfaces.

A knowledge graph is a knowledgebase integrated with a graph database. By integrating a knowledgebase with a graph database, a knowledge graph supports a much wider and deeper range of services than a standard graph database. In other words, the knowledge graph links information together, such as, for example, facts, entities, and locations, to create interconnected search results that are more accurate and relevant. More specifically, the knowledge graph is a knowledgebase consisting of millions of pieces of data corresponding to frequently searched for information and the context or intent behind asking for the information based on available content.

A chatbot is a computer program, which conducts a conversation with a user via auditory or textual methods. Chatbots are designed to simulate how a human would behave as a conversational partner. Typically, chatbots are used in dialog systems for various practical purposes, such as customer service or information acquisition. Current chatbots scan for keywords within the input, then retrieve a reply having the most matching keywords or the most similar word pattern from a database. Many industries, organizations, enterprises, and agencies, such as, for example, banks, insurance companies, media companies, e-commerce companies, airline companies, hotel chains, retailers, health care providers, educational institutions, government agencies, restaurant chains, and the like, use chatbots to answer simple questions and increase user engagement.

However, current methods of using knowledge graphs with artificial intelligence currently have several issues. For example, one current method of using knowledge graphs with artificial intelligence is based on the artificial intelligence program using predefined rules to call the knowledge graph to complete some type of query or computing work via an application programming interface. An issue with this first method is that the predefined rules are inflexible and can only be used to answer predefined questions.

A second current method of using knowledge graphs with artificial intelligence is based on the artificial intelligence program using predefined question and answer templates. The goal of this second method is to find a template that corresponds to the submitted query and then fill in the missing slots of the template. In other words, popular queries are translated into templates and entities are left as slots in the templates, which can be filled while answering a user's query. An example of a template may be XXX (Person) is the president of XXX(Country) or XXX(City) is the capital of XXX(Country). Issues with this second method are that the templates can only fit a small knowledge graph, enumerating all query paths in the knowledge graph is challenging, preparing the templates is time consuming, and maintaining the templates is difficult.

A third current method of using knowledge graphs with artificial intelligence is based on embedding the knowledge graph with vertices and edges and exploring the embedded knowledge graph with a deep learning method, such as, for example, a graph neural network. Issues with this third method is that query results are unexplainable, query performance is mainly dependent on the quality of the training data, and it's hard to use in an industry or organization as compared with academic research.

SUMMARY

According to one illustrative embodiment, a computer-implemented method for generating a query result utilizing a knowledge graph in an artificial intelligence chatbot is provided. A computer identifies characteristics of a query. The computer maps the characteristics of the query to base elements of the knowledge graph in the artificial intelligence chatbot. The computer generates a set of query paths in the knowledge graph based on the mapping of the characteristics of the query to the base elements of the knowledge graph. The computer validates one or more query paths in the set of query paths in the knowledge graph based on a respective score of each query path. The computer generates a query result corresponding to the query based on the validated one or more query paths in the knowledge graph. According to other illustrative embodiments, a computer system and computer program product for generating a query result utilizing a knowledge graph in an artificial intelligence chatbot are provided.

As a result, the illustrative embodiments increase performance of the artificial intelligence chatbot by utilizing knowledge graph technology with base query element detection, graph path generation, and graph path validation. In addition, the artificial intelligence chatbot of the illustrative embodiments is more flexible as compared to current rule-based and template-based chatbots because the artificial intelligence chatbot of the illustrative embodiments utilizes base query elements definitions in the knowledge graph. Consequently, the artificial intelligence chatbot of the illustrative embodiments is not limited to predefined queries. Further, the artificial intelligence chatbot of the illustrative embodiments provides reasonable query results, which is important to industries and organizations, because the artificial intelligence chatbot of the illustrative embodiments validates the generated query paths in the knowledge graph by calculating a query path score for each of the generated query paths.

DETAILED DESCRIPTION

Figure 1:
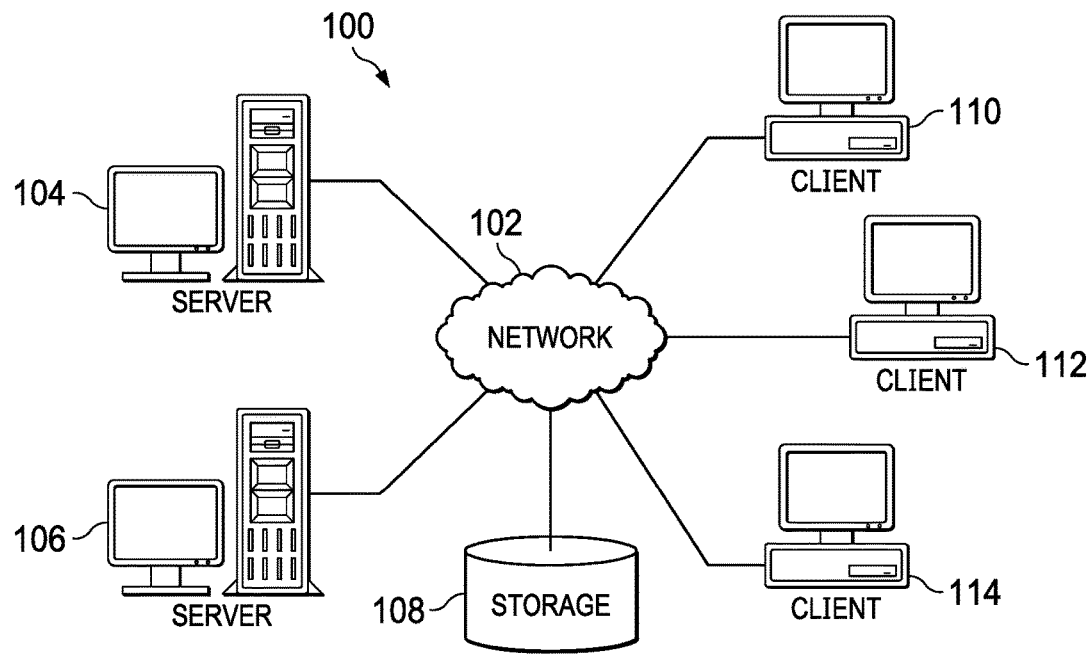
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
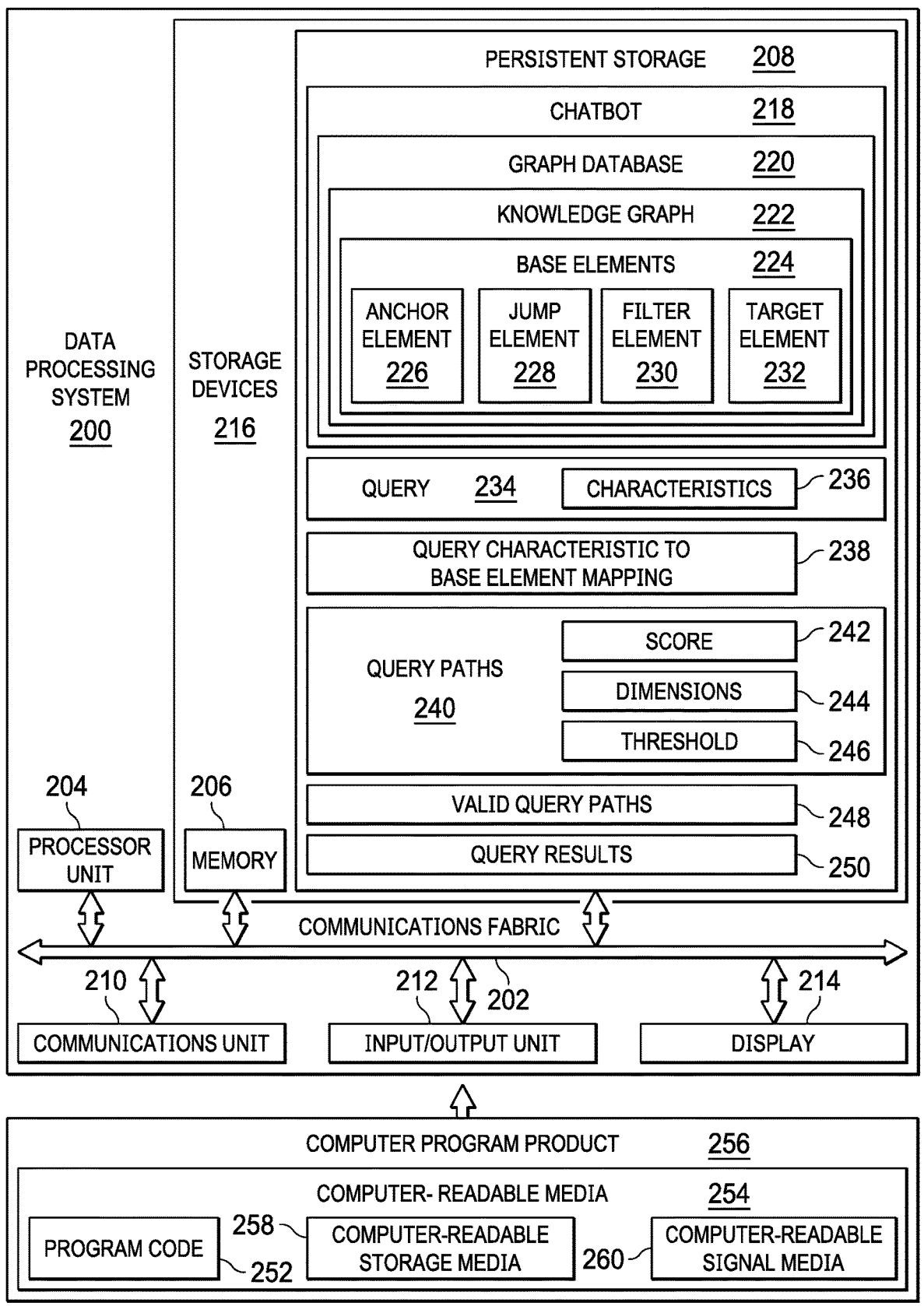
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2, are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide a set of one or more chatbot services to client devices. Also, it should be noted that server 104 and server 106 may represent clusters of servers in a data center. Alternatively, server 104 and server 106 may computing nodes in a cloud environment.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart televisions, smart appliances, gaming devices, kiosks, and the like, with wire or wireless communication links to network 102. Users of clients 110, 112, and 114 may utilize clients 110, 112, and 114 to access and utilize the chatbot services provided by server 104 and server 106.

Storage 108 is a network storage device capable of storing any type of data in a structured format or an unstructured format. In addition, storage 108 may represent a plurality of network storage devices. Further, storage 108 may represent a graph database comprising a knowledge graph corresponding to one or more data domains, such as, for example, an insurance domain, a financial domain, an educational domain, an entertainment domain, a gaming domain, and the like. Furthermore, storage 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores chatbot 218. However, it should be noted that even though chatbot 218 is illustrated as residing in persistent storage 208, in an alternative illustrative embodiment chatbot 218 may be a separate component of data processing system 200. For example, chatbot 218 may be a hardware component coupled to communication fabric 202 or a combination of hardware and software components.

Chatbot 218 may be, for example, an artificial intelligence program or other type of machine learning program. Data processing system 200 utilizes chatbot 218 to interact with client device users who submit queries via speech or textual inputs. Chatbot 218 utilizes graph database 220, which comprises knowledge graph 222, to generate query results for received queries by defining base elements 224 in knowledge graph 222 that meet the needs of the received queries and generating query paths in knowledge graph 222 based on mapping characteristics of the received queries to base elements 224.

Base elements 224 are defined base query elements, which correspond to a graph query language that can be identified by graph database 220. In this example, base elements 224 include anchor element 226, jump element 228, filter element 230, and target element 232. However, it should be noted that alternative illustrative embodiments may include more base elements based on industry or organizational needs.

Anchor element 226 represents entities, such as, for example, people, places, objects, events, companies, and the like, in knowledge graph 222. Jump element 228 represents relationships between data stored in knowledge graph 222. Filter element 230 represents filtering conditions on data stored in knowledge graph 222. Target element 232 represents target attributes of data stored in knowledge graph 222.

Query 234 represents a natural language query. In addition, query 234 may represent any type of query or question. Data processing system 200 receives query 234 from a client device, such as client 110 in FIG. 1. Data processing system 200 utilizes chatbot 218 to identify and extract characteristics 236 of query 234. Characteristics 236 include, for example, one or more of keywords, key phrases, traits, features, properties, and the like, contained in query 234.

After identifying and extracting characteristics 236 from query 234, chatbot 218 performs query characteristics to base element mapping 238. Query characteristics to base element mapping 238 represents a mapping between each of characteristics 236 of query 234 and a corresponding base element in base elements 224 of knowledge graph 222. Chatbot 218 utilizes query characteristics to base element mapping 238 to generate query paths 240 in knowledge graph 222. Query paths 240 represent a set of one or more possible paths in knowledge graph 222 to find the appropriate information for or answer to query 234.

After generating query paths 240 in knowledge graph 222 for query 234, chatbot 218 generates score 242 for each query path in query paths 240 based on dimensions 244. Chatbot 218 may represent score 242 as, for example, a number, a percentage, or the like. Dimensions 244 may include, for example, ordering of words within query 234, information or ground truth that can find valid results for query 234 in knowledge graph 222, possibility that query 234 is submitted based on query history, and the like.

Further, chatbot 218 may compare score 242 of each query path to threshold 246. Threshold 246 represents a minimum query path score threshold level. Chatbot 218 utilizes threshold 246 to identify valid query paths 248. Valid query paths 248 represent a set of one or more valid query paths in knowledge graph 222. In other words, if chatbot 218 generates a score for a particular query path that is above threshold 246, then chatbot 218 identifies that particular query path as a valid query path. Alternatively, chatbot 218 may select the highest scoring query path as the only valid query path. Chatbot 218 utilizes valid query paths 248 to generate query result 250. Query result 250 represents a valid, reasonable answer to query 234.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 252 is located in a functional form on computer readable media 254 that is selectively removable and may be loaded onto or transferred to data processing system 200 for running by processor unit 204. Program code 252 and computer readable media 254 form computer program product 256. In one example, computer readable media 254 may be computer readable storage media 258 or computer readable signal media 260. Computer readable storage media 258 may include, for example, an optical or magnetic disc that is inserted or placed into a drive or other device that is part of persistent storage 208 for transfer onto a storage device, such as a hard drive, that is part of persistent storage 208. Computer readable storage media 258 also may take the form of a persistent storage, such as a hard drive, a thumb drive, or a flash memory that is connected to data processing system 200. In some instances, computer readable storage media 258 may not be removable from data processing system 200.

Alternatively, program code 252 may be transferred to data processing system 200 using computer readable signal media 260. Computer readable signal media 260 may be, for example, a propagated data signal containing program code 252. For example, computer readable signal media 260 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 252 may be downloaded over a network to persistent storage 208 from another device or data processing system through computer readable signal media 260 for use within data processing system 200. For instance, program code stored in a computer readable storage media in a data processing system may be downloaded over a network from the data processing system to data processing system 200. The data processing system providing program code 252 may be a server computer, a client computer, or some other device capable of storing and transmitting program code 252.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 258 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Artificial intelligence chatbots play an important role in many industries and organizations today. Currently, retrieve and rank and classification are most common technologies used in artificial intelligence chatbots when finding the most relevant answers to queries submitted by users. In addition, knowledge graphs are a frontier and popular technology today. Compared with retrieve and rank and classification, using knowledge graph technology in an artificial intelligence chatbot has several advantages. For example, using a knowledge graph in an artificial chatbot provides an ability to more readily understand user queries as compared with retrieve and rank or classification. Further, using a knowledge graph in an artificial chatbot provides an ability to extend beyond submitted user queries. Furthermore, using a knowledge graph in an artificial chatbot enables more flexible user queries and provides more comprehensive and reasonable answers to those user queries.

An artificial intelligence chatbot of illustrative embodiments identifies characteristics of a user's natural language query and automatically converts the natural language query to a graph query language, which can be identified by a graph database containing a knowledge graph, by utilizing several steps. First, the artificial intelligence chatbot of illustrative embodiments defines base query elements in the knowledge graph to meet the needs of the submitted natural language query. Illustrative embodiments utilize four defined types of base query elements in the knowledge graph. The four defined base elements include an anchor element, a jump element, a filter element, and a target element. The anchor element represents entities in the knowledge graph. The jump element represents relationships in the knowledge graph. The filter element represents filtering conditions in the knowledge graph. The target element represents target attributes in the knowledge graph. However, it should be noted that the number of base query elements can be increased if needed by an industry or organization. Illustrative embodiments map each base query element to a graph query language script, which is based on the graph database and the graph query language selected.

Second, the artificial intelligence chatbot of illustrative embodiments, using natural language processing, extracts useful information, such as characteristics (e.g., key terms) from the submitted natural language query. The artificial intelligence chatbot of illustrative embodiments then maps the extracted information to the defined base query elements in the knowledge graph.

Third, the artificial intelligence chatbot of illustrative embodiments dynamically builds one or more query paths in the knowledge graph based on mapping the extracted information to the defined base query elements in the knowledge graph. Fourth, the artificial intelligence chatbot of illustrative embodiments generates a score for each built query path based on multiple dimensions to determine whether each particular query path is valid or not. The multiple dimensions may include, for example, the order of words in the natural language query, ground truth that validates a result of the natural language query in the knowledge graph, possibility that the natural language query was submitted based on query history, and the like. Fifth, the artificial intelligence chatbot of illustrative embodiments finds query results in the knowledge graph based on valid query paths.

As a result, illustrative embodiments increase performance of the artificial intelligence chatbot by utilizing knowledge graph technology with base query element detection, graph path generation, and graph path validation. In addition, artificial intelligence chatbots of illustrative embodiments are more flexible as compared to current rule-based and template-based chatbots because artificial intelligence chatbots of illustrative embodiments utilize base query elements definitions in the knowledge graph. Consequently, artificial intelligence chatbots of illustrative embodiments are not limited to predefined queries. Further, artificial intelligence chatbots of illustrative embodiments provide reasonable query results, which is important to industries and organizations, because artificial intelligence chatbots of illustrative embodiments validate query paths in the knowledge graph by calculating scores for the query paths. Furthermore, illustrative embodiments are scalable because the query translation layer, the natural language processing layer, and the query path generation layer are isolated from each other.

Thus, illustrative embodiments provide one or more technical solutions that overcome a technical problem with utilizing a knowledge graph with an artificial intelligence chatbot. As a result, these one or more technical solutions provide a technical effect and practical application in the field of artificial intelligence chatbots.

Figure 3:
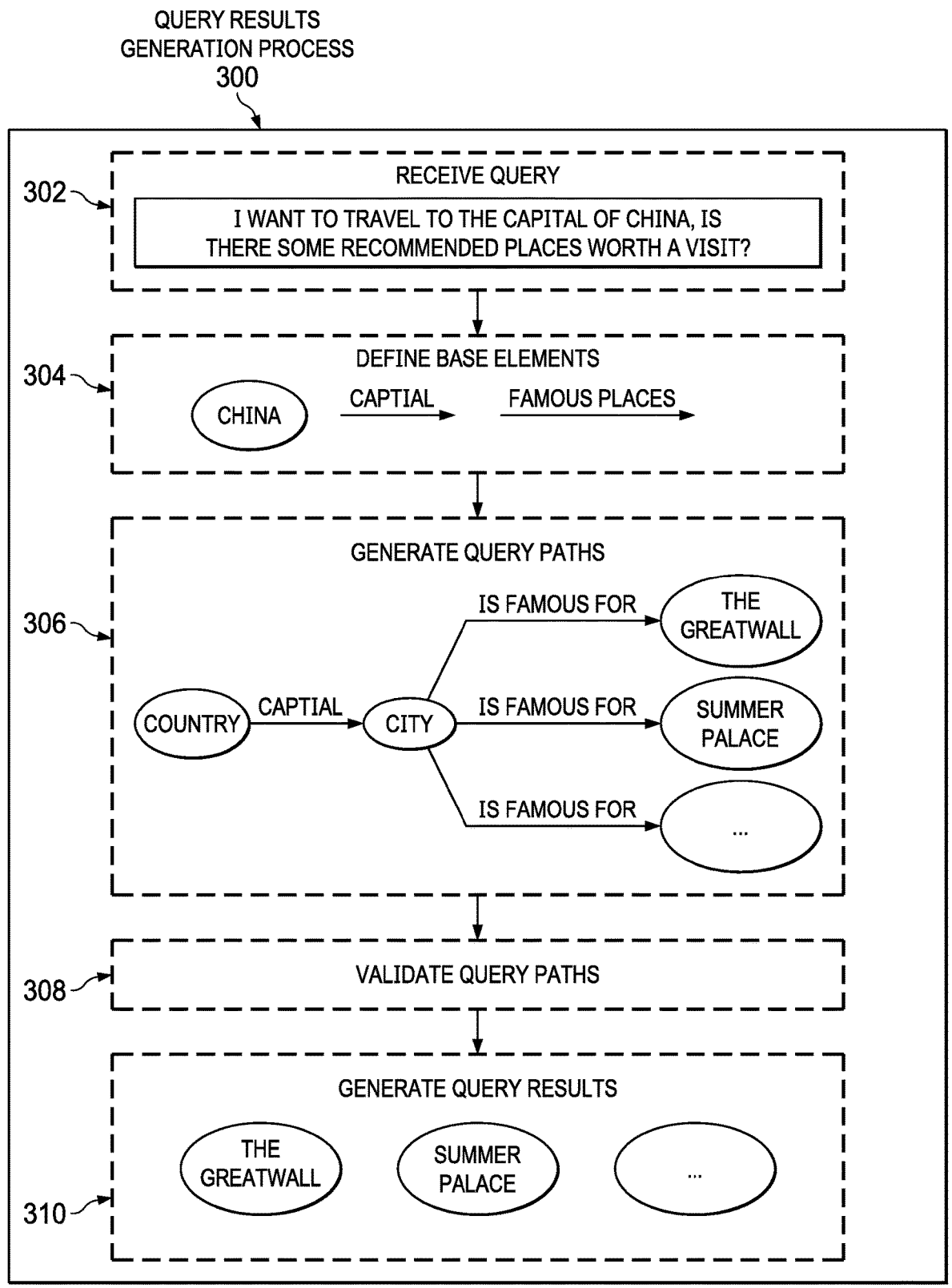
FIG. 3 is a diagram illustrating an example of a query results generation process in accordance with an illustrative embodiment.

With reference now to FIG. 3, a diagram illustrating an example of a query results generation process is depicted in accordance with an illustrative embodiment. Query results generation process 300 may be implemented in a network of data processing systems, such as network data processing system 100 in FIG. 1. Query results generation process 300 is a process for generating a query result corresponding to a natural language query using a knowledge graph in an artificial intelligence chatbot with base query element detection, query path generation, and query path validation.

In this example, query results generation process 300 includes steps 302, 304, 306, 308, and 310. However, it should be noted that query results generation process 300 may include more or fewer steps than shown. For example, one step may be divided into two or more steps, two or more steps may be combined into one step, one or more steps not shown may be added, or the like.

At step 302, a data processing system, such as server 104 in FIG. 1 or data processing system 200 in FIG. 2, receives the natural language query "I want to travel to the capital of China, is there some recommended places worth a visit?" from a client device, such as client 110 in FIG. 1. At step 304, the data processing system utilizes an artificial intelligence chatbot to define base query elements in the knowledge graph to match the requirements of the received natural language query. In this example, the defined base query elements include anchor element "China", jump element "capital", and jump element "famous places".

At step 306, the artificial intelligence chatbot generates query paths in the knowledge graph based on the defined base query elements meeting the needs of the received natural language query. In this example, the generated query paths include anchor element "Country" with jump element "capital" to anchor element "city". Anchor element "city" has three "is famous for" jump elements to anchor elements "the great wall", "summer place", and " . . . ", respectively.

At step 308, the artificial intelligence chatbot validates the query paths by calculating a score for each query path. The artificial intelligence chatbot may, for example, compare each query path score to a score threshold level and validate only those query paths having a query path score greater than the score threshold level. Alternatively, the artificial intelligence chatbot may only validate the query path with the highest query path score.

At step 310, the artificial intelligence chatbot generates a query result corresponding to the received natural language query based on valid query paths in the knowledge graph. In this example, the query result is "the great wall", "summer palace", and " . . . " to the received natural language query "I want to travel to the capital of China, is there some recommended places worth a visit?" The artificial intelligence chatbot outputs the query result to the client device via text or speech.

Figure 4:
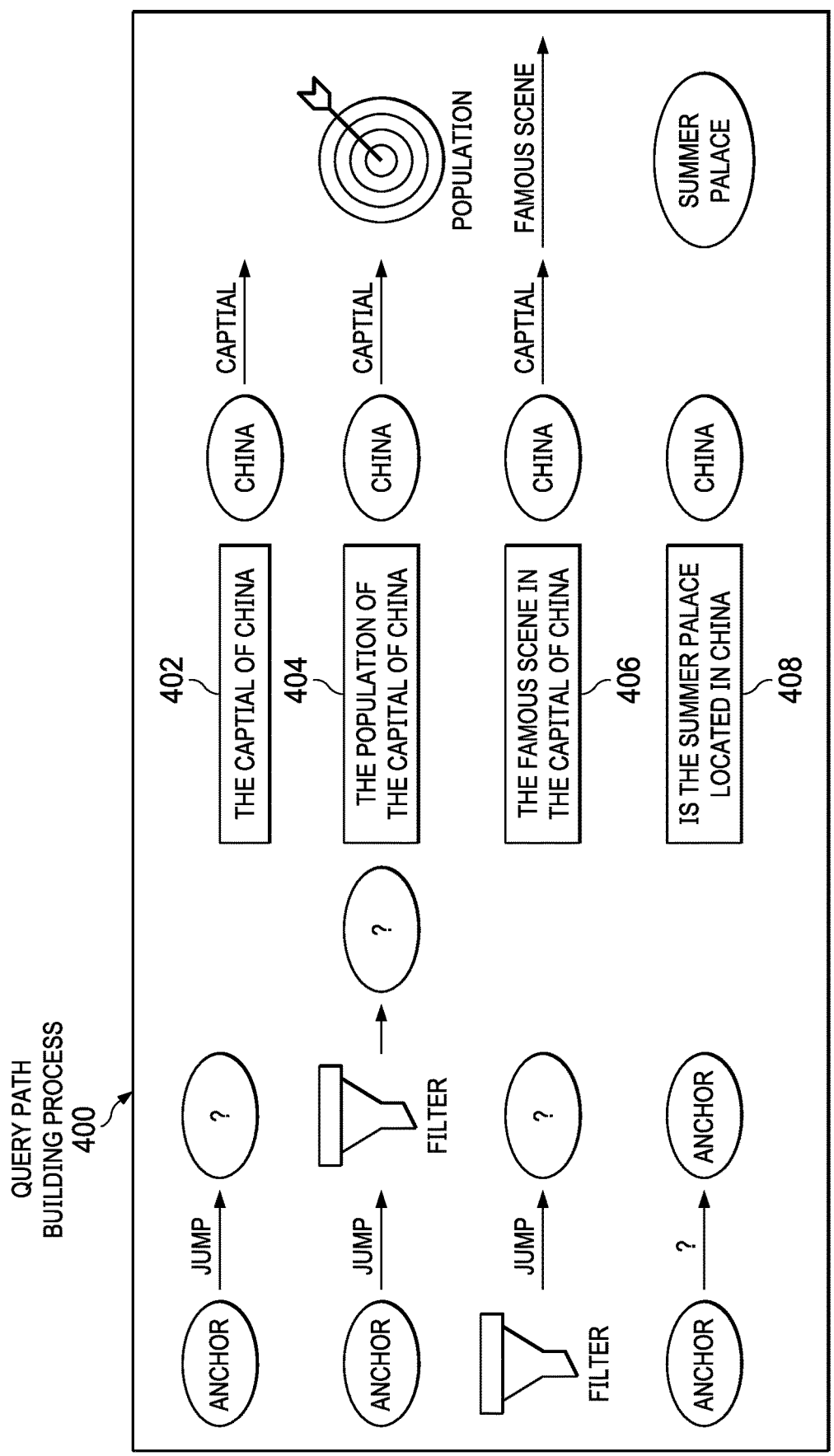
FIG. 4 is a diagram illustrating an example of a query path generation process in accordance with an illustrative embodiment.

With reference now to FIG. 4, a diagram illustrating an example of a query path generation process is depicted in accordance with an illustrative embodiment. Query path generation process 400 may be implemented in a computer, such as, for example, server 104 in FIG. 1 or data processing system 200 in FIG. 2. In this example, query path generation process 400 illustrates query paths 402, 404, 406, and 408.

Query path 402 includes an anchor element with a jump element for "The capital of China", which in this example is the anchor element "China" with the jump element "capital". The query result for this example would be Beijing. Query path 404 includes an anchor element with a jump element to a filter element for "The population of the capital of China", which in this example is the anchor element "China" with the jump element "capital" to the target element "population". The query result for this example would be approximately 21.5 million.

Query path 406 includes a filter element with a jump element for "The famous scene in the capital of China", which in this example is the anchor element "China" with the jump element "capital" to the jump element "famous scene". The query result for this example would be the summer palace. Query path 408 includes an anchor element to another anchor element for a question regarding "Is the summer palace located in China?", which in this example is the anchor element "China" to the anchor element "summer palace". In this example, an artificial intelligence chatbot, such as chatbot 218 in FIG. 2, of the computer searches for a valid path between the two anchor elements in the knowledge graph. If the artificial intelligence chatbot does not find a valid path in the knowledge graph for the query, then the artificial intelligence chatbot determines that no connection exists between the two anchor elements. If the artificial intelligence chatbot does find a valid path in the knowledge graph for the query, then the artificial intelligence chatbot determines that the summer palace is located in China.

Figure 5:
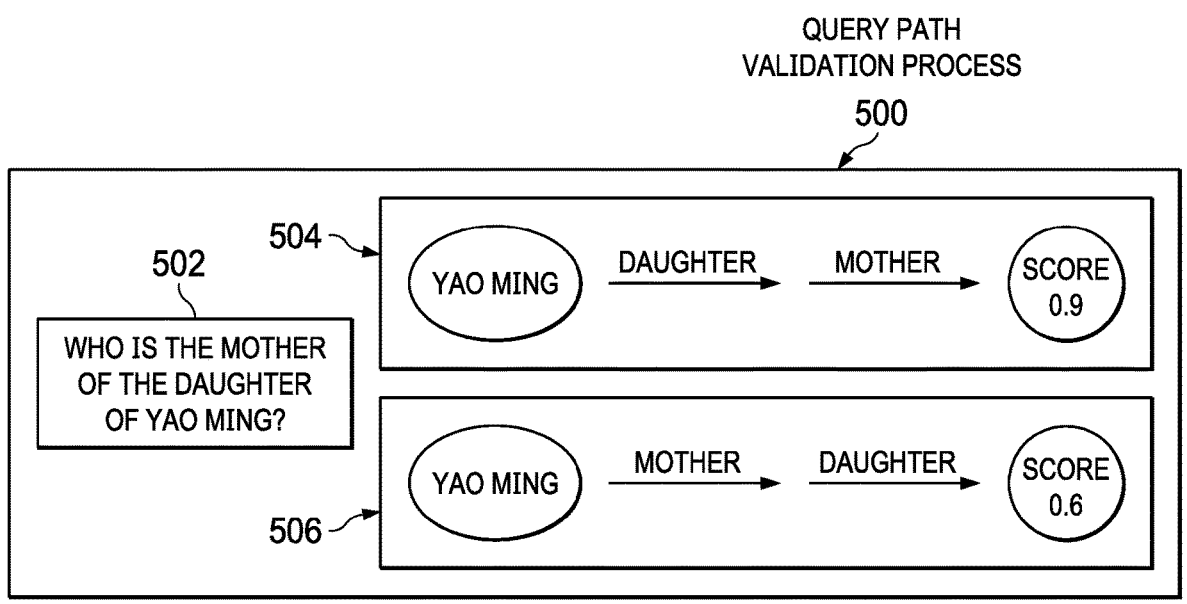
FIG. 5 is a diagram illustrating an example of a query path validation process in accordance with an illustrative embodiment.

With reference now to FIG. 5, a diagram illustrating an example of a query path validation process is depicted in accordance with an illustrative embodiment. Query path validation process 500 may be implemented in a computer, such as, for example, server 104 in FIG. 1 or data processing system 200 in FIG. 2. In this example, query path validation process 500 is for received natural language query 502, which is "Who is the mother of the daughter of Yao Ming?"

Query path 504 includes anchor element "Yao Ming" with jump element "daughter" to jump element "mother". In this example, an artificial intelligence chatbot, such as chatbot 218 in FIG. 2, of the computer generates a query path validation score of "0.9" for query path 504. Query path 506 includes anchor element "Yao Ming" with jump element "mother" to jump element "daughter". In this example, the artificial intelligence chatbot generates a query path validation score of "0.6" for query path 506. In this example, the artificial intelligence chatbot selects query path 504, which has the highest query path score, as the valid query path for generating the query result for received natural language query 502.

Figure 6:
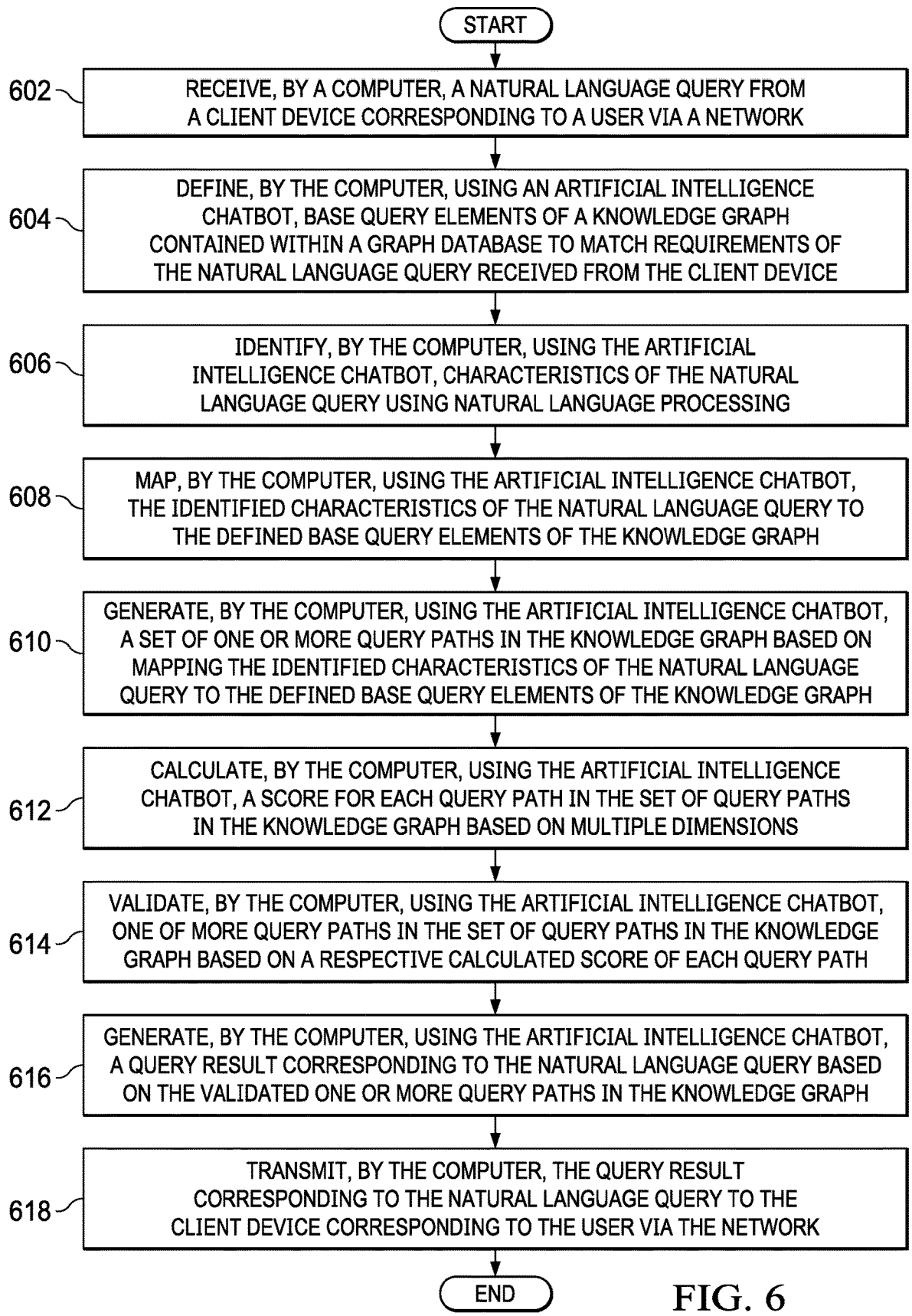
FIG. 6 is a flowchart illustrating a process for generating a query result corresponding to a natural language query in accordance with an illustrative embodiment.

With reference now to FIG. 6, a flowchart illustrating a process for generating a query result corresponding to a natural language query utilizing a knowledge graph in an artificial intelligence chatbot is shown in accordance with an illustrative embodiment. The process shown in FIG. 6 may be implemented in a computer, such as, for example, server 104 in FIG. 1 or data processing system 200 in FIG. 2.

The process begins when the computer receives a natural language query from a client device corresponding to a user via a network (step 602). The computer, using an artificial intelligence chatbot, such as chatbot 218 in FIG. 2, defines base query elements of a knowledge graph contained within a graph database to match requirements of the natural language query received from the client device (step 604). The computer, using the artificial intelligence chatbot, also identifies characteristics of the natural language query using natural language processing (step 606).

The computer, using the artificial intelligence chatbot, maps the identified characteristics of the natural language query to the defined base query elements of the knowledge graph (step 608). In addition, the computer, using the artificial intelligence chatbot, generates a set of one or more query paths in the knowledge graph based on mapping the identified characteristics of the natural language query to the defined base query elements of the knowledge graph (step 610). Further, the computer, using the artificial intelligence chatbot, calculates a score for each query path in the set of query paths in the knowledge graph based on multiple dimensions (step 612). The multiple dimensions may include, for example, sentence structure (e.g., order of words, grammar, punctuation, and the like), ground truth that validates a query result in the knowledge graph, whether the query is included in a query history (e.g., the same or similar query was submitted previously), and the like.

Afterward, the computer, using the artificial intelligence chatbot, validates one or more query paths in the set of query paths in the knowledge graph based on a respective calculated score of each query path (step 614). The computer, using the artificial intelligence chatbot, generates a query result corresponding to the natural language query based on the validated one or more query paths in the knowledge graph (step 616). The computer transmits the query result corresponding to the natural language query to the client device corresponding to the user via the network (step 618). Thereafter, the process terminates.

Thus, illustrative embodiments of the present invention provide a computer-implemented method, computer system, and computer program product for generating a query result utilizing a knowledge graph in an artificial intelligence chatbot. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a query result utilizing a knowledge graph in an artificial intelligence chatbot, the computer-implemented method comprising:
   identifying, by a computer, characteristics of a query;
   mapping, by the computer, the characteristics of the query to base elements of the knowledge graph in the artificial intelligence chatbot;
   generating, by the computer, a set of query paths in the knowledge graph based on the mapping of the characteristics of the query to the base elements of the knowledge graph;
   validating, by the computer, one or more query paths in the set of query paths in the knowledge graph based on a respective score of each query path; and
   generating, by the computer, a query result corresponding to the query based on the validated one or more query paths in the knowledge graph, wherein the base elements of the knowledge graph in the artificial intelligence chatbot are defined base query elements, and wherein the defined base query elements comprise an anchor element, a jump element, a filter element, and a target element, wherein the anchor element represents entities in the knowledge graph, the jump element represents relationships between data stored in the knowledge graph, the filter element represents filtering conditions on the data stored in the knowledge graph, and the target element represents target attributes of the data stored in the knowledge graph.

2. The computer-implemented method of claim 1, further comprising:
   receiving, by the computer, the query from a client device corresponding to a user via a network.

3. The computer-implemented method of claim 2, further comprising:
   transmitting, by the computer, the query result corresponding to the query to the client device corresponding to the user via the network.

4. The computer-implemented method of claim 1, further comprising:
   defining, by the computer, the base elements of the knowledge graph to match requirements of the query.

5. The computer-implemented method of claim 1, further comprising:
   calculating, by the computer, the respective score of each query path in the set of query paths in the knowledge graph based on multiple dimensions comprising order of words in the query, ground truth that validates the query result in the knowledge graph, and whether the query was submitted based on a query history.

6. The computer-implemented method of claim 1, wherein the query is a natural language query.

7. The computer-implemented method of claim 1, wherein the computer utilizes natural language processing to identify the characteristics of the query.

8. The computer-implemented method of claim 6, wherein the defined base query elements correspond to a graph query language that can be identified by a graph database containing the knowledge graph, and further comprising:
   converting the natural language query to the graph query language.

9. The computer-implemented method of claim 1, wherein a valid query path in the validated one or more query paths has a corresponding query path score above a query path score threshold level.

10. The computer-implemented method of claim 1, wherein a valid query path in the validated one or more query paths has a highest query path score.

11. The computer-implemented method of claim 1, wherein the characteristics of the query include keywords contained in the query.

12. A computer system for generating a query result utilizing a knowledge graph in an artificial intelligence chatbot, the computer system comprising:
   a bus system;
   a storage device connected to the bus system, wherein the storage device stores program instructions; and
   a processor connected to the bus system, wherein the processor executes the program instructions to:
   identify characteristics of a query;
   map the characteristics of the query to base elements of the knowledge graph in the artificial intelligence chatbot;
   generate a set of query paths in the knowledge graph based on the mapping of the characteristics of the query to the base elements of the knowledge graph;

validate one or more query paths in the set of query paths in the knowledge graph based on a respective score of each query path; and generate a query result corresponding to the query based on the validated one or more query paths in the knowledge graph, wherein the base elements of the knowledge graph in the artificial intelligence chatbot are defined base query elements, and wherein the defined base query elements comprise an anchor element, a jump element, a filter element, and a target element, wherein the anchor element represents entities in the knowledge graph, the jump element represents relationships between data stored in the knowledge graph, the filter element represents filtering conditions on the data stored in the knowledge graph, and the target element represents target attributes of the data stored in the knowledge graph.

13. The computer system of claim 12, wherein the processor further executes the program instructions to:
receive the query from a client device corresponding to a user via a network.

14. The computer system of claim 13, wherein the processor further executes the program instructions to:
transmit the query result corresponding to the query to the client device corresponding to the user via the network.

15. The computer system of claim 12, wherein the processor further executes the program instructions to:
define the base elements of the knowledge graph to match requirements of the query.

16. The computer system of claim 12, wherein the processor further executes the program instructions to:
calculate the respective score of each query path in the set of query paths in the knowledge graph based on multiple dimensions comprising order of words in the query, ground truth that validates the query result in the knowledge graph, and whether the query was submitted based on a query history.

17. A computer program product for generating a query result utilizing a knowledge graph in an artificial intelligence chatbot, the computer program product comprising a non-transitory computer readable storage medium having program instructions embodied therewith, the program instructions executable by a computer to cause the computer to perform a method comprising:
identifying, by the computer, characteristics of a query;
mapping, by the computer, the characteristics of the query to base elements of the knowledge graph in the artificial intelligence chatbot;
generating, by the computer, a set of query paths in the knowledge graph based on the mapping of the characteristics of the query to the base elements of the knowledge graph;
validating, by the computer, one or more query paths in the set of query paths in the knowledge graph based on a respective score of each query path; and
generating, by the computer, a query result corresponding to the query based on the validated one or more query paths in the knowledge graph, wherein the base elements of the knowledge graph in the artificial intelligence chatbot are defined base query elements, and wherein the defined base query elements comprise an anchor element, a jump element, a filter element, and a target element, wherein the anchor element represents entities in the knowledge graph, the jump element represents relationships between data stored in the knowledge graph, the filter element represents filtering conditions on the data stored in the knowledge graph, and the target element represents target attributes of the data stored in the knowledge graph.

18. The computer program product of claim 17, further comprising:
receiving, by the computer, the query from a client device corresponding to a user via a network.

19. The computer program product of claim 18, further comprising:
transmitting, by the computer, the query result corresponding to the query to the client device corresponding to the user via the network.

20. The computer program product of claim 17, further comprising:
defining, by the computer, the base elements of the knowledge graph to match requirements of the query.

21. The computer program product of claim 17, further comprising:
calculating, by the computer, the respective score of each query path in the set of query paths in the knowledge graph based on multiple dimensions comprising order of words in the query, ground truth that validates the query result in the knowledge graph, and whether the query was submitted based on a query history.

* * * * *